Jan. 24, 1933.  W. H. ALLISON  1,895,363
PROCESS FOR PRODUCING PLATE GLASS
Filed July 7, 1931
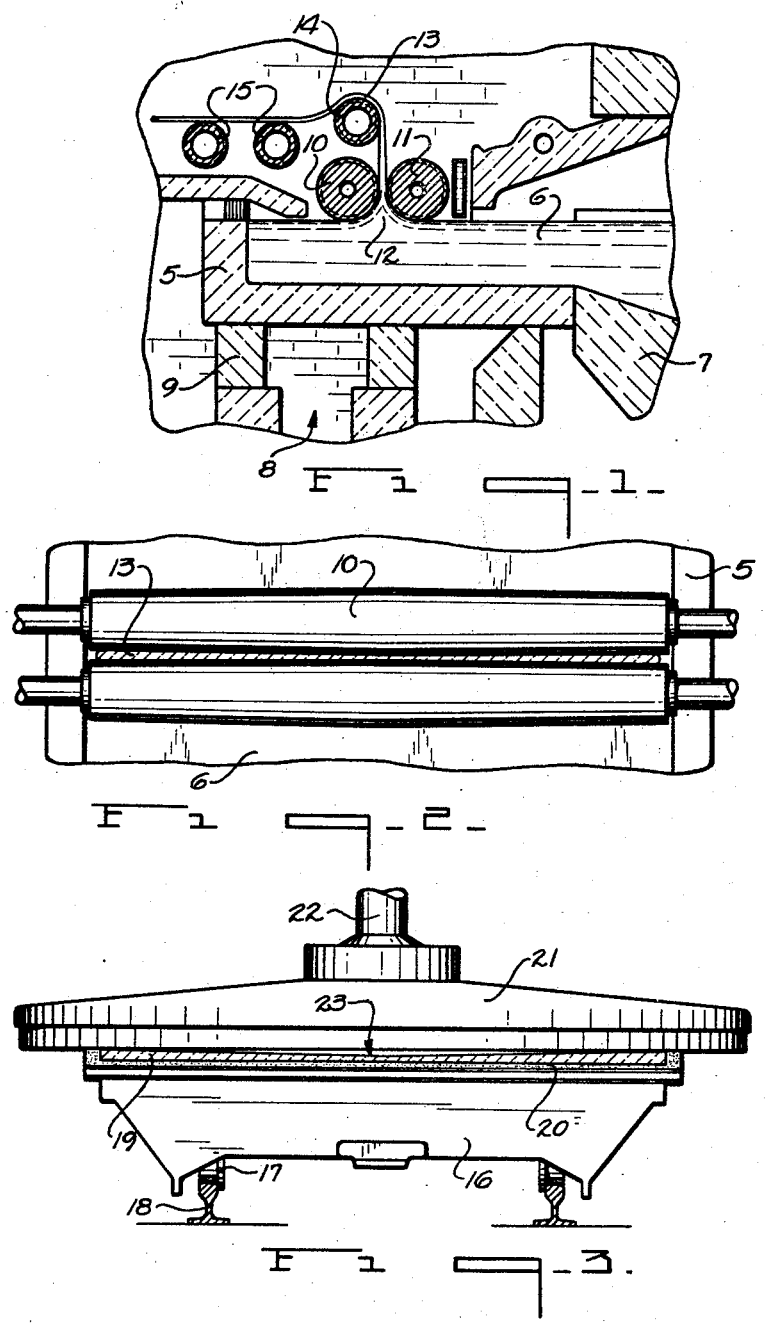
Inventor
William H. Allison
By Frank Fraser
Attorney Patented Jan. 24, 1933

1,895,363

UNITED STATES PATENT OFFICE

WILLIAM H. ALLISON, OF CHARLESTON, WEST VIRGINIA, ASSIGNOR TO LIBBEY-OWENS-FORD GLASS COMPANY, OF TOLEDO, OHIO, A CORPORATION OF OHIO

PROCESS FOR PRODUCING PLATE GLASS

Application filed July 7, 1931. Serial No. 549,235.

The present invention relates to an improved process for producing plate glass.

In the production of plate glass according to the continuous system, a plurality of sheets of glass to be surfaced are mounted upon a series or train of cars or tables and passed in a definite substantially horizontal path first beneath a series of grinding runners and then beneath a series of polishing runners to surface one side of the sheets, after which the said sheets are turned over upon the tables and again passed beneath the same or a second series of grinding and polishing runners to surface the second side.

The grinding runners employed in the continuous system referred to above are relatively very heavy, being ordinarily in the form of solid discs constructed of cast iron or the like. These runners are also usually carried at the lower ends of vertically disposed drive spindles in such a manner that they are permitted a limited amount of universal rocking and vertical bodily movement.

The sheets of glass which are to be ground and polished are usually termed "plate glass blanks", and heretofore these blanks have been formed so that the opposite surfaces thereof were relatively flat and substantially parallel with one another. However, I have found that when using a plate glass blank which is relatively thinner at its center than at the opposite sides thereof or, in other words, when the surface of the sheet to be ground and polished is slightly concave, that the grinding runners seat themselves better upon the glass during the grinding thereof, as a result of which the tendency of the runners to rock upon the sheets is materially lessened and, as a consequence, breakage of the glass from this cause is reduced to a minimum.

Therefore, the principal aim and object of this invention is the production of a plate glass blank of the above character which is relatively thinner at its center than at the sides thereof, and the subsequent grinding and polishing of the opposite faces of this blank in the usual fashion to render them plane and parallel with one another.

Other objects and advantages of the invention will become more apparent during the course of the following description when taken in connection with the accompanying drawing.

In the drawing forming a part of this application and wherein like numerals are employed to designate like parts throughout the same, Fig. 1 is a vertical longitudinal section through one type of sheet forming apparatus which may be employed in the carrying out of the present invention, Fig. 2 is a plan view of the sheet forming rolls, Fig. 3 is a representation of one form of grinding apparatus, and Fig. 4 is a sectional view of a finished ground and polished sheet.

Referring to the drawing, the numeral 5 designates a relatively shallow working receptacle or pot containing a mass of molten glass 6 supplied thereto from any suitable type of melting furnace 7. In order to more effectively control the temperature of the molten bath 6, the working receptacle 5 is preferably arranged within a heating compartment 8 being supported therein upon stools 9.

Positioned above the mass of molten glass 6 and in relatively close proximity to the surface thereof are the two forming rolls 10 and 11, preferably, although not necessarily, disposed side by side in substantial horizontal alignment wth one another as shown. These rolls are also preferably positively driven in such a manner that after a sheet has been started by the use of a bait or other means as is well understood in the art, a relatively thick heavy body of glass 12 will be continuously drawn or moved vertically from the receptacle 5 between the said rolls and reduced thereby to sheet form as indicated at 13. The rolls 10 and 11 are adjustably mounted relative to one another to permit the production of the desired thickness of sheet which is controlled by the width of the sheet forming pass created therebetween. The sheet 13, after passing between the rolls 10 and 11, is continued upwardly for a relatively short distance and then deflected into the horizontal plane about a bending roll 14 and carried along upon a plurality of conveying rolls 15 into and through an annealing leer. Of course, the bending roll 14 could be omitted, if desired, and the sheet deflected into the horizontal plane about forming roll 10.

The type of rolling machine generally described hereinabove and illustrated in the drawing is particularly well adapted for the production of plate glass blanks which are to be subsequently ground and polished. Heretofore, the forming rolls 10 and 11 have ordinarily been of true cylindrical form having a uniform diameter throughout the entire length of the body portions thereof which engaged the glass so that the sheet produced thereby was of a relatively uniform thickness, with the opposite surfaces thereof substantially flat and parallel. However, according to the present invention, the forming rolls 10 and 11 are of such a construction that the sheet 13 formed thereby is relatively thinner at its center than at the opposite sides thereof as clearly shown in Fig. 2. That is to say, the sheet forming rolls taper from their centers toward their opposite ends so that the opposite surfaces of the glass sheet are relatively concave, with the concavity or recess in each face increasing in depth from the side edges of the sheet to the center thereof.

When the sheet leaves the forming rolls 10 and 11, it is of course still relatively plastic, and therefore the bending roll 14 and conveying rolls 15 are preferably of the same construction as the forming rolls so that they will serve to support the sheet in a manner to prevent sagging of the thinner central portion thereof with respect to the thicker side portions until the said sheet has become sufficiently set to support its own weight.

After the continuous sheet 13 has been thoroughly and completely annealed, it is cut transversely into individual sheets and these sheets are especially well adapted for use as plate glass blanks. Moreover, this particular type of blank is very desirable for use in the continuous system for surfacing sheet glass. As pointed out above, in this system a plurality of cars or tables carrying the glass sheets to be treated upon the upper surfaces thereof are passed first beneath a series of grinding runners and then beneath a series of polishing runners to surface one side of the sheets, after which the said sheets are turned over upon the tables and again passed beneath the same or a second series of grinding and polishing runners to surface the second side.

In Fig. 3 of the drawing, the numeral 16 designates one of the tables of the continuous system, which is here shown as being mounted upon wheels 17 adapted to run along the rails 18. The glass sheets 19 constituting the plate glass blanks are adapted to be secured upon the upper surfaces of the tables by embedding them within a layer of plaster of Paris or the like 20. One of the grinding runners is designated at 21 and is carried at the lower end of a vertical drive spindle 22. After the glass sheets have been secured upon the tables, they are adapted to be passed first beneath a series of the grinding runners 21 and thence beneath a series of polishing runners (not shown) to surface the upper sides thereof. During this grinding and polishing, the recess or depression 23 in the upper face of the sheet will be removed so that when the surfacing thereof has been completed, the said face of the sheet will be flat or plane. The sheets are then turned over upon the tables and again secured thereto, after which the second side is treated in the same manner so as to render the sheet of a uniform thickness throughout, with the opposite surfaces thereof being plane and parallel with one another as illustrated in Fig. 4. As set forth above, when using plate glass blanks which are slightly concave or, in other words, relatively thinner at their centers than at their opposite sides, the relatively heavy grinding runners tend to seat themselves better upon the glass during the grinding thereof so that there is less rocking of said runners and consequently less breakage of the glass.

The present invention is, of course, not restricted to the use of either the particular type of sheet forming means or to the particular type of grinding means herein disclosed. On the contrary, these are only exemplary forms of apparatus which can be employed in carrying out this invention.

The process and apparatus disclosed herein for producing the glass sheets or plate glass blanks which are relatively thinner at their centers than at the opposite sides thereof, are not being claimed per se in this application since they constitute the subject-matter of a copending application filed by me on July 7, 1932, Serial No. 549,234.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing plate glass, which consists in first forming a plate glass blank comprising a sheet of glass, the surface thereof which is to be ground and polished being concave, mounting the sheet horizontally upon a support with the concave surface uppermost, then passing the said sheet forwardly in a definite substantially horizontal path, in subjecting the upper surface of said sheet during the forward travel thereof to a grinding action to remove the depression therein and render it plane or flat by bringing into engagement therewith successively a plurality of revolving grinding disc runners which operate upon the glass sheet across its entire width, and in then polishing the ground surface.

2. The process of producing plate glass, which consists in first forming a plate glass blank comprising a sheet of glass which is relatively thinner at its center than at the opposite sides thereof, mounting the sheet horizontally upon a support and carrying it forwardly in a definite substantially horizontal path beneath and in contact successively with a plurality of grinding machines arranged in series above the said sheets and each provided with a revolving disc runner which operates upon the glass sheet across its entire width to remove the depression therein and render the said surface plane or flat, and in then polishing the ground surface.

Signed at Charleston, in the county of Kanawha and State of West Virginia, this 3rd day of July, 1931.

WILLIAM H. ALLISON.